United States Patent [19]

Shank et al.

[11] Patent Number: 4,619,387
[45] Date of Patent: Oct. 28, 1986

[54] FIBER OPTIC CLEAVING TOOL

[75] Inventors: Jeffrey B. Shank, Williamsport; Timmy D. Troutman, Lock Haven, both of Pa.

[73] Assignee: GTE Products Corporation, Stamford, Conn.

[21] Appl. No.: 776,249

[22] Filed: Sep. 16, 1985

[51] Int. Cl.⁴ .................................. C03B 37/16
[52] U.S. Cl. ........................... 225/96.5; 225/2; 225/101
[58] Field of Search .............. 225/2, 96, 96.5, 101

[56] References Cited

U.S. PATENT DOCUMENTS 4,159,793 7/1979 Belmonte et al. ............. 225/96.5
4,557,049 12/1985 Cribbs et al. ................. 225/96 X
4,573,617 3/1986 Durkow ......................... 225/2 X Primary Examiner—Frank T. Yost
Attorney, Agent, or Firm—William H. McNeill

[57] ABSTRACT

A fiber optic cleaving tool includes, as one half of a clamping member, an elongated cleaver base pad which has one end fixed to an anvil which is mounted adjacent a cutter blade. The base pad includes alignment means, which can be upraised walls, for removably receiving a fiber guide pad having a groove therein for accepting a specific size of optical fiber. To work with a different fiber size, only the fiber guide pad is replaced, and thus the necessary critical alignment of the fiber with the cutting blade is maintained.

5 Claims, 4 Drawing Figures

FIBER OPTIC CLEAVING TOOL

TECHNICAL FIELD

This invention relates to hand-held fiber optic cleaving tools and more particularly to such tools which can be readily, easily and accurately modified to accept and cut different sizes of optical fibers.

BACKGROUND ART

The use of optical fibers in data transmission is growing at a rapid rate. The installation and field repair of such systems requires easy to use tools employed for cleaving (cutting) the fibers in a manner to provide a fiber end that is smooth, flat and perpendicular to the fiber axis.

Such tools have been developed and are shown and described in U.S. Pat. Nos. 4,159,793 and 4,074,840, the teachings of which are herein incorporated by reference.

Devices constructed according to the above-enumerated patents have performed well and have achieved success in the field; but some problems exist.

The existing tools used for optical fiber end preparation allows an operator to work with a variety of buffered fiber sizes but does not provide for precision cleave length. If a specific or repetitive cleave length is desired the operator must manually measure the fiber and mark it prior to cleaving. The tool must be partially disassembled to accept the different clamps and buffer arms used when cleaving 1 mm, 0.25 mm and 0.5 mm buffered fiber. This disassembly of the tool can be detrimental to the cleaved ends, which must be smooth, flat and perpendicular to the fiber axis if high coupling efficiencies are to be obtained.

DISCLOSURE OF THE INVENTION

It is, therefore, an object of the invention to obviate the disadvantages of the prior art.

It is another object of the invention to enhance cleaving tools.

It is yet another object of the invention to provide an improved cleaving tool.

Still another object of the invention is the provision of a cleaving tool which can readily be adapted to different sizes of buffered fibers without danger of destroying critical alignment.

These objects are accomplished, in one aspect of the invention, by a fiber optic cleaving tool which has a pair of pivoted handles operable to actuate two spaced apart pairs of clamping members and a cutting blade. The cutting blade is movable along an axis toward an optical fiber carrying anvil. An elongated cleaver base pad having alignment means thereon is fixedly attached at one end to the anvil. A fiber guide pad is removably positioned on the cleaver base pad and is precisely located thereon by means cooperating with the alignment means. The fiber guide means has a groove therein for receiving an optical fiber.

By providing the fixed mounting for the cleaver base, different sizes of optical fibers can be accommodated by changing only the fiber guide means, thus, the necessary critical alignment is always maintained.

DESCRIPTION OF THE BEST MODE

For a better understanding of the present invention, together with other and further objects, advantages and capabilities thereof, reference is made to the following disclosure and appended claims taken in conjunction with the above-described drawings.

Figure 1:
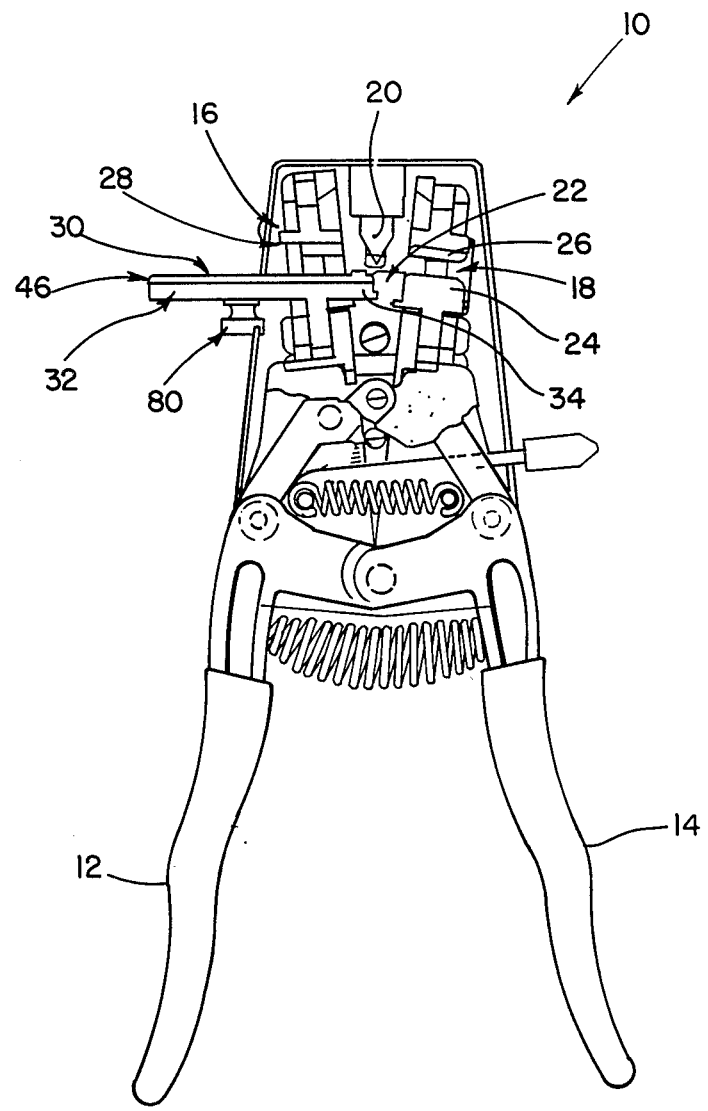
FIG. 1 is an elevational view, partially in section of a fiber optic cleaving tool embodying the invention.

Referring now to the drawings with greater particularity, there is shown in FIG. 1 a fiber optic cleaving tool 10 having a pair of pivoted handles 12 and 14 operable to actuate two spaced apart pairs of clamping members 16 and 18 and a cutting blade 20, in accordance with the teachings of the above-recited patents. The cutting blade 20 is movable along an axis toward an anvil 22.

Clamping member 18 is comprised of a fixed lower jaw 24 and a movable upper jaw 26.

Figure 2:
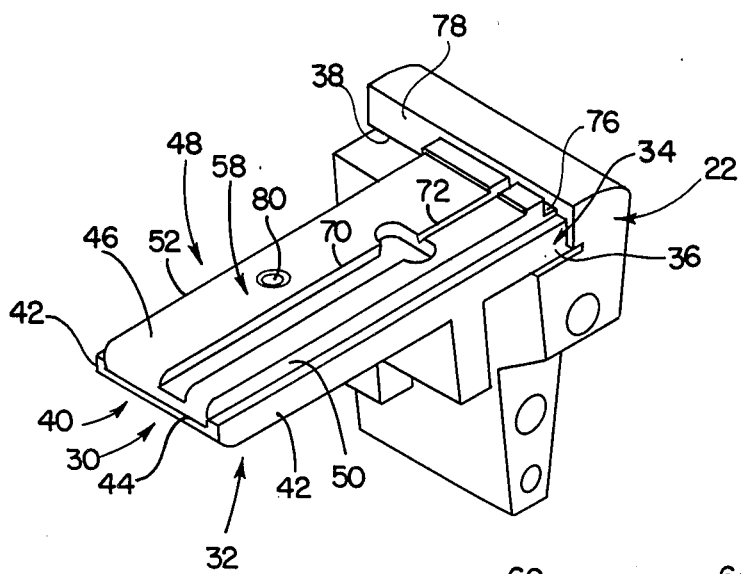
FIG. 2 is a perspective view of an embodiment of the invention.

Clamping member 16 is comprised of a movable upper jaw 28 and a fixed lower jaw 30. The fixed lower jaw 30 comprises an elongated cleaver base pad 32 fixedly attached at an end 34 to the anvil 22, as by a flange 36 engaging a slot 38. Alignment means 40 are provided on cleaver base pad 32 and, in the embodiment shown in FIG. 2 comprise spaced apart walls 42 defining a trough 44 therebetween.

A fiber guide pad 46 is removably positioned on the cleaver base pad 32 and is precisely located thereon by means 48 cooperating with the alignment means 40. In the embodiment shown in FIG. 2 the means 48 are the outside edges 50, 52 of the fiber guide pad 46 which engage the walls 42.

Figure 4:
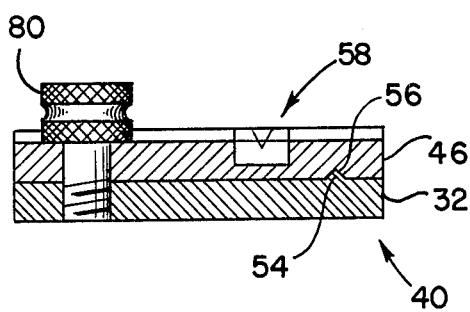
FIG. 4 is a sectional view of an alternate form of alignment means.

An alternate embodiment is shown in FIG. 4 wherein the alignment means 40 comprises a longitudinal key 54 formed on cleaver base pad 32 and a mating keyway 56 in the underside of fiber guide pad 46. Other alignment means can be employed.

Figure 3:
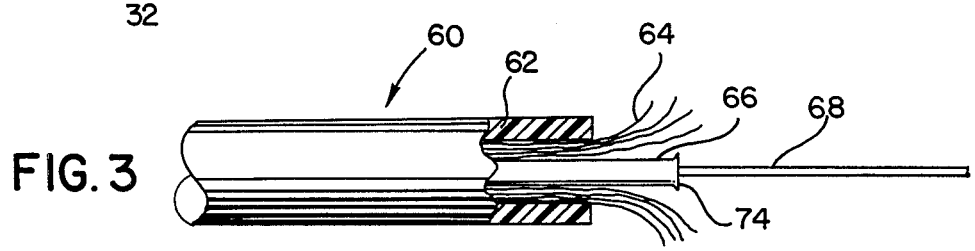
FIG. 3 is a partial, sectional view of a typical optical fiber cable.

Fiber guide pad 46 is provided with a multi-level groove 58 for engaging and positioning an optical fiber cable 60, such as that shown in FIG. 3. The cable 60 comprises an outer jacket 62 surrounding a fibrous strength material 64, such as filamentary Kevlar. The fibrous material 64 surrounds a buffer coating 66 which, in turn, surrounds the optical fiber 68.

Accordingly, groove 58 comprises a first portion 70 for receiving jacket 62 and fibrous material 64 and a second portion 72 for receiving the buffer coating 66.

Preparing a cable 60 for cleaving requires removing sections of jacket 62, material 64 and buffer coating 66 to expose a sufficient length of fiber 68 which, obviously, must be long enough to extend across both clamping members. In this process it is not unusual for buffer coating 66 to be left with a projecting burr 74. Since the burr 74 will interfere with the placement of fiber 68 across anvil 22, a burr receiving trough 76 is provided adjacent anvil 22. The assymmetry of anvil 22 about its alignment axis with cutter 20 provides a stop means 78 against which the end of buffer coating 68 abuts, allowing the establishment of a set distance between the centerline of the cutter 20 and the end of the buffer coating, an important consideration for field work with optical fibers.

The removability and replacement of fiber guide pad 46 is preferably accomplished by means of a threaded thumb screw 80, shown on the underside of cleaver base pad 32 in FIG. 1, and the upper surface of fiber guide pad 46 in FIG. 4. The thumb screw 80 passes through an aperture in one member and engages a threaded opening in the other.

Accordingly, there is here provided an improved fiber optic cleaving tool which maintains critical alignment with a variety of fiber sizes; and it is readily serviceable by operators in the field.

While there have been shown and described what are at present considered to be the preferred embodiments of the invention, it will be apparent to those skilled in the art that various changes and modifications can be made herein without departing from the scope of the invention as defined by the appended claims.

We claim:

1. In a fiber optic cleaving tool having a pair of pivoted handles operable to actuate two spaced apart pairs of clamping members and a cutting blade, said cutting blade being movable along an axis toward an optical fiber carrying anvil, the improvement comprising: an elongated cleaver base pad fixedly attached at one end to said anvil, said cleaver base pad having alignment means formed thereon; and a fiber guide pad removably positioned on said cleaver base pad, said fiber guide pad being precisely located by means thereon cooperating with said alignment means, said fiber guide pad having a groove therein for receiving an optical fiber.

2. The cleaving tool of claim 1 wherein said one end of said cleaver base pad is formed to provide a flange which engages a slot formed in said anvil.

3. The cleaving tool of claim 1 wherein said alignment means comprises upstanding, spaced apart walls defining a trough therebetween.

4. The cleaving tool of claim 1 wherein said alignment means comprises a key, a mating keyway being formed on said fiber guide pad.

5. The cleaving tool of claim 1 wherein said fiber guide pad is removably positioned on said cleaver base pad by means of a threaded screw passing through an aperture in said fiber guide pad and engaging a threaded opening in said cleaver base pad.

* * * * *